United States Patent
Iyer et al.

(10) Patent No.: US 12,341,867 B2
(45) Date of Patent: Jun. 24, 2025

(54) STARTING TRANSMISSION OF A FRAME WITH A DESIRED STARTING POLARITY, AND RELATED SYSTEMS, METHODS AND DEVICES

(71) Applicant: Microchip Technology Incorporated, Chandler, AZ (US)

(72) Inventors: Venkatraman Iyer, Austin, TX (US); Dixon Chen, Guangdong (CN)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 17/655,137

(22) Filed: Mar. 16, 2022

(65) Prior Publication Data
US 2023/0269312 A1  Aug. 24, 2023

(30) Foreign Application Priority Data
Feb. 18, 2022 (CN) .......................... 202210151634.1

(51) Int. Cl.
*H04L 69/28* (2022.01)
*H04L 69/323* (2022.01)

(52) U.S. Cl.
CPC ............ *H04L 69/28* (2013.01); *H04L 69/323* (2013.01)

(58) Field of Classification Search
CPC ..................................................... G02F 1/163
See application file for complete search history.

(56) References Cited

U.S. PATENT DOCUMENTS

| 6,385,738 | B1 * | 5/2002 | Lo | H04L 1/242 714/25 |
| 11,121,782 | B2 * | 9/2021 | Zang | H04B 17/17 |
| 2004/0189806 | A1 * | 9/2004 | Berkey | H04N 23/66 348/192 |
| 2009/0046744 | A1 * | 2/2009 | Hamanaka | H04L 47/10 370/503 |

(Continued)

FOREIGN PATENT DOCUMENTS

WO  2020/229700 A1  11/2020

OTHER PUBLICATIONS

Graber, Steffen, 10 Mb/s Single Twisted Pair Ethernet Evaluation Board Update, IEEE Draft (May 17, 2017), IEEE-SA, Piscataway, NJ, (available at grouper.ieee.org/groups/802/3/cg/public/May2017/Graber_3cg_07_0517.pdf), 28 pages.

(Continued)

*Primary Examiner* — Zhiren Qin
(74) *Attorney, Agent, or Firm* — TraskBritt (57) ABSTRACT

Disclosed are systems, methods, and devices for communicating a source of a 10SPE wake. Such a communication may be performed over a low-pin count hardware interface of a 10SPE physical layer (PHY) module having a split arrangement. A controller side of a 10SPE PHY may perform a local or remote 10SPE wake forward in response to a communicated source of a wake. Also disclosed is a digital interface for operatively coupling a PHY controller to PHY transceiver over a low-pin count connection, where the digital interface includes circuitry for checking the integrity of circuitry of the digital interface. Also disclosed is a PHY transceiver of a 10SPE PHY, where the transceiver includes a circuitry for controlling a starting polarity of frames.

13 Claims, 5 Drawing Sheets

(56) References Cited

U.S. PATENT DOCUMENTS

| | | | |
|---|---|---|---|
| 2009/0110405 A1* | 4/2009 | Lee | H04B 10/1143 |
| | | | 398/130 |
| 2015/0326342 A1* | 11/2015 | Thaler | H04L 1/24 |
| | | | 370/310 |
| 2016/0124566 A1* | 5/2016 | Kwon | G06F 3/04166 |
| | | | 345/174 |
| 2018/0239042 A1* | 8/2018 | Ware | G01V 1/22 |
| 2019/0268453 A1* | 8/2019 | Yu | H04L 25/03866 |
| 2020/0266854 A1* | 8/2020 | Gardner | H04B 3/542 |
| 2021/0055980 A1* | 2/2021 | Chen | G06F 11/322 |
| 2021/0058168 A1* | 2/2021 | Zang | H04B 17/29 |
| 2021/0058225 A1* | 2/2021 | Yu | H04L 7/02 |
| 2021/0303050 A1* | 9/2021 | Ching | G06F 1/3203 |
| 2022/0263808 A1* | 8/2022 | Tong | H04L 69/323 |

OTHER PUBLICATIONS

International Search Report for International Application No. PCT/US2022/071185, mailed Nov. 4, 2022, 6 pages.
International Written Opinion for International Application No. PCT/US2022/071185, mailed Nov. 4, 2022, 10 pages.

* cited by examiner

FIG. 5

STARTING TRANSMISSION OF A FRAME WITH A DESIRED STARTING POLARITY, AND RELATED SYSTEMS, METHODS AND DEVICES

PRIORITY CLAIM

This application claims the benefit of the filing date of the People's Republic of China Patent Application Serial No. 202210151634.1, filed Feb. 18, 2022, for "STARTING TRANSMISSION OF A FRAME WITH A DESIRED STARTING POLARITY, AND RELATED SYSTEMS, METHODS AND DEVICES," the disclosure of which is incorporated herein in its entirety by this reference.

FIELD

This disclosure relates, generally, to single pair Ethernet networks. Some examples relate to limited connection count interface for a 10SPE physical layer module having a split arrangement. Some examples relate to starting transmission of a frame with a predetermined starting polarity and controlling the same at a physical layer transceiver of an Ethernet PHY.

BACKGROUND

Interconnects are widely used to facilitate communication among devices of a network, sub-systems and systems. Generally speaking, electrical signals are transmitted on a physical medium (e.g., a bus, a coaxial cable, or a twisted pair, without limitation—generically referred to simply as a "line" or a "bus") by the devices coupled to the physical medium.

According to the Open Systems Interconnection model (OSI model), Ethernet-based computer networking technologies use baseband transmission (i.e., electrical signals are discrete electrical pulses) to transmit data packets and ultimately messages that are communicated among network devices. According to the OSI model, specialized circuitry called a physical layer (PHY) device or controller is used to interface between an analog domain of a line and a digital domain of a data link layer (also referred to herein simply as a "link layer") that operates according to packet signaling. While the data link layer may include one or more sublayers, in Ethernet-based computer networking, a data link layer typically includes at least a media access control (MAC) layer that provides control abstraction of the physical layer. By way of non-limiting example, when transmitting data to another device on a network, a MAC controller may prepare frames for the physical medium, add error correction elements, and implement collision avoidance. Further, when receiving data from another device, a MAC controller may ensure integrity of received data and prepare frames for higher layers.

There are various network topologies that implement physical layers and link layers (and may include other layers, without limitation). The Peripheral Component Interconnect (PCI) standard and the Parallel Advanced Technology Attachment (Parallel ATA) standard, both in use since the early 1990's, may implement a multidrop bus topology. The trend since the early 2000's has been to use point-to-point bus topologies, for example, the PCI Express standard (PCIe) and the Serial ATA (SATA) standard implement point-to-point topologies.

A typical point-to-point bus topology may implement lines between each device (e.g., dedicated point-to-point, without limitation) or lines between devices and switches (e.g., switched point-to-point, without limitation). In a multidrop bus topology, a physical transmission medium is a shared bus and each network device is coupled to the shared bus, for example, via a circuit chosen based on the type of physical medium (e.g., coaxial or twisted pair, without limitation).

Point-to-point bus topologies, such as a dedicated point-to-point topology or a switched point-to-point topology, require more wires and more expensive material than multidrop topologies due, in part, to the greater number of links between devices. In certain applications, such as automotive, there may be physical constraints that make it difficult to directly connect devices, and so a topology that does not require, or does not require as many, direct connections (e.g., a multidrop topology, without limitation) in a network or a sub-network may be less susceptible to, or hampered by, such constraints.

Devices that are on a baseband network (e.g., a multidrop network without limitation) share the same physical transmission medium, and typically use the entire bandwidth of that medium for transmission (stated another way, a digital signal used in baseband transmission occupies the entire bandwidth of the media). As a result, only one device on a baseband network may transmit at a given instant. So, media access control methods are sometimes used to handle contention for such a shared transmission medium.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

In the following detailed description, reference is made to the accompanying drawings, which form a part hereof, and in which are shown, by way of illustration, specific examples of examples in which the present disclosure may be practiced. These examples are described in sufficient detail to enable a person of ordinary skill in the art to practice the present disclosure. However, other examples may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example or this disclosure to the specified components, steps, features, functions, or the like.

It will be readily understood that the components of the examples as generally described herein and illustrated in the drawing could be arranged and designed in a wide variety of different configurations. Thus, the following description of various examples is not intended to limit the scope of the present disclosure, but is merely representative of various examples. While the various aspects of the examples may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the examples disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, any relational term, such as "over," "under," "on," "underlying," "upper," "lower," etc., is used for clarity and convenience in understanding the disclosure and accompanying drawings and does not connote or depend on any specific preference, orientation, or order, except where the context clearly indicates otherwise.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

In this description the term "coupled" and derivatives thereof may be used to indicate that two elements co-operate or interact with each other. When an element is described as being "coupled" to another element, then the elements may be in direct physical or electrical contact or there may be intervening elements or layers present. In contrast, when an element is described as being "directly coupled" to another element, then there are no intervening elements or layers present. The terms "on" and "connected" may be used in this description interchangeably with the term "coupled," and have the same meaning unless expressly indicated otherwise or the context would indicate otherwise to a person having ordinary skill in the art.

As used herein, the terms "assert," "de-assert" and derivatives thereof used in reference to a pin, means, respectively, to assert or de-assert a signal associated with the pin (e.g., a signal specifically assigned to the pin or a signal to which the pin is specifically assigned, without limitation).

A vehicle, such as an automobile, a truck, a bus, a ship, and/or an aircraft, may include a vehicle communication network. The complexity of the vehicle communication network may vary depending on a number of electronic devices within the network. For example, an advanced vehicle communication network may include various control modules for, as non-limiting examples, engine control, transmission control, safety control (e.g., antilock braking), and emissions control. To support these modules, the automotive industry relies on various communication protocols.

10SPE (i.e., 10 Mbps Single Pair Ethernet) is a network technology currently under specification of IEEE 802.3cg™. 10SPE may be used to provide a collision free, deterministic transmission on, e.g., a multi-drop network or shared transmission medium, without limitation.

Some bit-level encoding processes are used to encode bits of a frame where the data of such an encoded frame is not sensitive to polarity. As a non-limiting example, in a Differential Manchester Encoded (DME) frame used in a 10SPE transmission scheme, bits of the frame are encoded by state transitions in the signal, and more specifically, the presence of a rising edge or a falling edge in the signal. Generally, whether a given state transition is a rising edge or a falling edge does not affect the encoding of a DME frame—just the presence of such a transition. The inventors of this disclosure appreciate that, in some cases, it may be desirable for a PHY transceiver to selectively control a polarity of a frame.

As used herein, the term "polarity" used in reference to a frame means the rising edge or falling edge of a transition of a bit of the frame, and the term "starting polarity" used in reference to a frame means the rising edge or falling edge of the first transition of the first bit of the frame; where a rising edge is defined as a first polarity and a falling edge is defined as a second polarity.

By way of non-limiting example, the starting polarity of frames (Ethernet or not) may sometimes affect electromagnetic emissions (EME) in a given electronic system, and so proactively sending frames having a specific or randomly generated pattern of polarities can be an effective strategy to minimize or control EME. The data (1s and 0s) of Ethernet frames are typically encoded using a form of Manchester-encoding (such as DME, without limitation) and the starting polarity of an Ethernet frame does not affect Manchester-encoded data.

By way of another non-limiting example, PHYs sometimes support detecting and/or diagnosing cable faults on a network, including 10SPE networks, via time-domain reflectometry, which may benefit from varying starting polarity of the pulses generated for cable fault diagnosis. Cable fault diagnosis is necessary for many applications, such as in vehicle communication networks utilizing 10SPE. Various types of cable faults can be detected and diagnosed, including cable "open" and cable "short" faults, and cable mismatches based on time domain reflection. The absence of cable faults can also be detected via time domain reflection (TDR).

For cable fault diagnosis, a pulse is transmitted from a PHY, and if a reflection is detected at the PHY then it may be determined that a cable fault exists. Further, based on the detected reflection (e.g., a phase and/or an orientation (positive or negative)), a type of cable fault may be determined. For example, if the detected reflection includes a shape that is similar to a shape of the transmitted pulse, it may be determined that an "open" fault exists. If the detected reflection includes a shape that is similar to, but opposite of, the transmitted pulse, it may be determined that a "short" fault exits. Further, if the detected reflection includes an amplitude that is different than an amplitude of the transmitted pulse, it may be determined that a "mismatch" fault exists. More specifically, if the detected reflection includes a shape that is similar to a shape of the transmitted pulse, and the reflection and the transmitted pulse have different amplitudes, it may be determined that an "open mismatch" fault exists. Further, if the detected reflection includes a shape that is similar to, but opposite of, the transmitted pulse, and the reflection and the transmitted pulse have different amplitudes, it may be determined that a "short mismatch" fault exits.

To identify the type of cable fault, a PHY generates a first short frame (i.e., a pulse) having a first starting polarity and then generates a second short frame have a second, opposite starting polarity of the first short frame. The information in the reflections frames can be used to identify the type of cable fault. However, in a split arrangement such as depicted by FIG. 1, the control logic for cable fault diagnostics is typically in the PHY controller (e.g., PHY controller 404), and though it can instruct the transmission circuitry of the PHY to generate pulses and then observe the reflection, a conventional PHY controller known to the inventors, in such a split arrangement, cannot control, or instruct, the starting polarity of a pulse generated by the transmission circuitry of a PHY transceiver.

One or more examples relate, generally, to controlling a starting polarity exhibited by a frame generated by a PHY transceiver. The PHY transceiver may, as a non-limiting example, be a PHY transceiver of a PHY having a split-arrangement or having another architecture. The PHY transceiver may be a transceiver provided at a 10SPE physical layer or another Ethernet physical layer. A signal conditioner of a PHY transceiver may include a polarity controller to selectively control the starting polarity to be exhibited by a frame to be transmitted. A signal generator provided at the polarity controller may control generation of a reference signal exhibiting a first or a second state in response to a polarity setting of a polarity setting register. The reference signal may be provided to a transmitter that controls the starting polarity of a next transmission of a frame in response to the state of the reference signal. A configuration logic (config logic) of the PHY transceiver may be to set the polarity setting of the polarity setting register. In some examples, a signal generator of the polarity controller may include logic for generating a reference signal according to a polarity rule, the logic enabled in response to a polarity setting of the polarity setting register.

Figure 1:
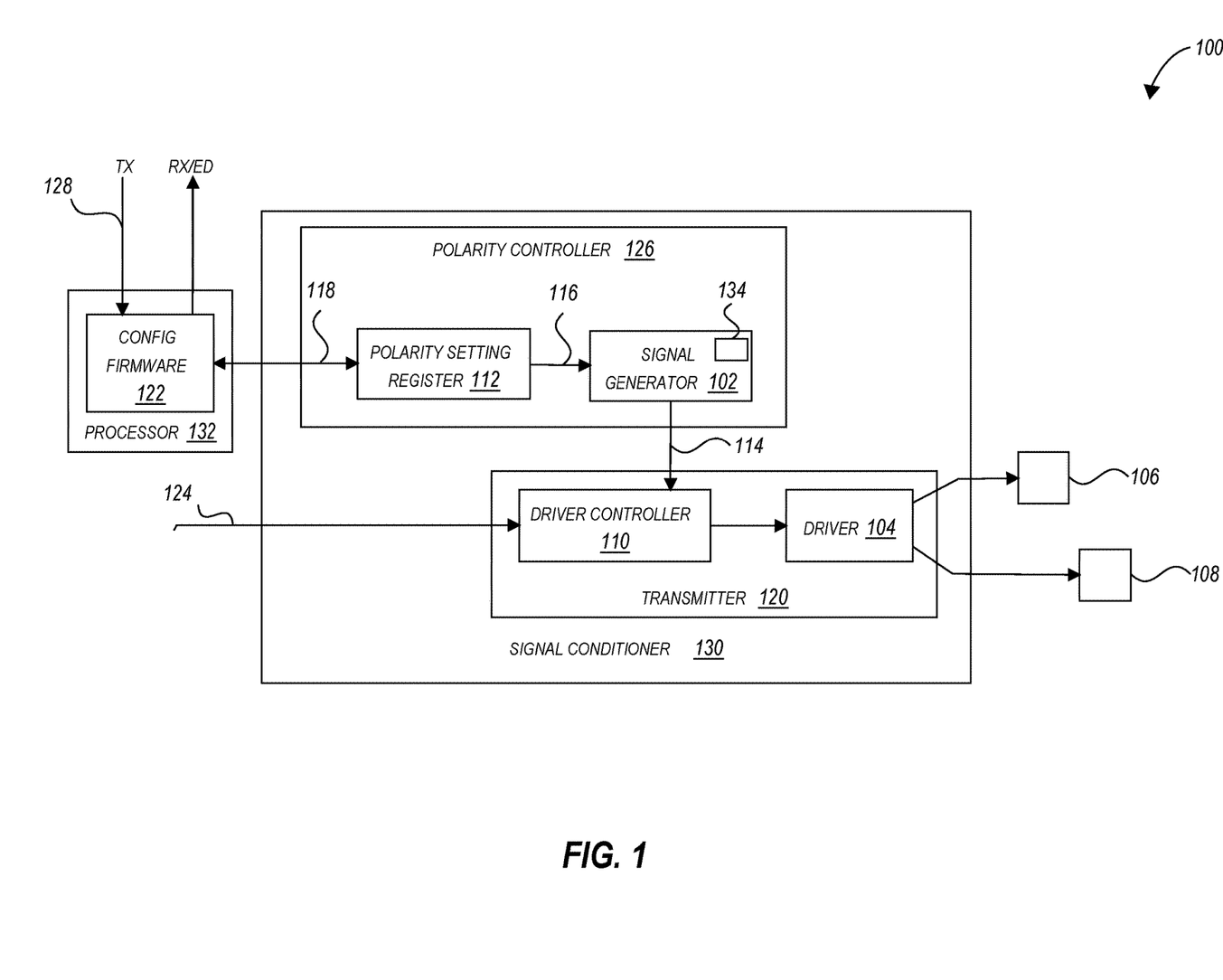
FIG. 1 is a block diagram depicting a portion of a physical layer transceiver that includes a test pulse control circuit, in accordance with one or more examples.

FIG. 1 is a block diagram depicting a signal conditioner 130 of a PHY transceiver portion 100, the signal conditioner 130 is to transmit frames exhibiting a predetermined starting polarity, in accordance with one or more examples. Signal conditioner 130 includes a transmitter 120 and a polarity controller 126. Transmitter 120 is configured, generally, to start transmission of a frame at a shared transmission medium in response to a frame instruction 124 (e.g., received from a PHY controller) and a reference signal 114 generated by polarity controller 126. Transmitter 120 includes a driver controller 110 is to generate control signals for driver 104 in response to a state of the reference signal 114. The driver 104 (e.g., a voltage signal driver) is to generate a differential signal at pins TRXP 106 and TRXN 108 and state transitions exhibited thereby in response to control signals provided by the driver controller 110 and frame instruction 124. A state transition may be generated at pins TRXP 106 and TRXN 108 and thereby at a shared transmission medium (e.g., transmission medium 414) coupled to the differential pins, as a non-limiting example, by applying a first voltage signal of 0V to one of TRXP 106 and TRXN 108 and a second, higher, voltage signal to the other of TRXP 106 and TRXN 108, and then switching the respective pins to which the first voltage signal and second voltage signal are applied.

The starting polarity exhibited by a frame generated by such signals, are controllable in response to the state of reference signal 114. Polarity controller 126 is, generally, to generate reference signal 114 exhibiting a predetermined state such that the voltage signals driven at differential pins TRXP 106 and TRXN 108 by driver 104 in response to the reference signal exhibit a predetermined starting polarity.

Reference signal 114 is generated by signal generator 102 of polarity controller 126. Signal generator 102 is, generally, to generate reference signal 114 at least partially in response to internal signal generation logic (such as one of logic modules 134 is to set an initial polarity by setting the state of reference signal 114 in response to a value of the polarity setting register 112, i.e., responsive to a polarity setting 116) and polarity setting 116 available at a polarity setting register 112 of polarity controller 126. The polarity setting 116 may be available at polarity setting register 112 having a value in response to polarity setting indication 118 provided by processor 132 (executing config firmware 122) in response to a configuration command 128 from a PHY controller (PHY controller not shown). By way of a contemplated operation with reference to FIG. 1 and FIG. 1, when a configuration command 128 from a PHY controller is received at PHY transceiver portion 100, an internal state machine transitions to a configuration state ("CONFIG" in FIG. 1) and PHY transceiver portion 100 waits for and executes configuration commands until commanded to reset, at which time the internal state machine transitions to a normal state ("NORMAL").

In one or more examples, processor 132 may be is (e.g., by executing config firmware 122) to enable a rule for the starting polarity of frames. Non-limiting examples of a starting polarity rule include: transmission of each and every frame having same starting polarity, alternate starting polarity of each and every nth frame (e.g., for cable fault detection or reducing EME, without limitation), and random starting polarity for each and every frame (e.g., for reducing EME without limitation).

By way of a non-limiting example of a contemplated operation, in a case where a PHY performs cable fault diagnosis, the configuration command 128 includes instructions to alternate the starting polarity of generated frames because, during cable fault diagnosis, reflections based on test pulses having different polarities reveal more about the state of the cable than if each and every pulse has the same starting polarity. Frame instructions 124 may include instructions to send "short" frames (e.g., exhibiting a waveform characteristically similar to a pulse train, without limitation). Processor 132 executing config firmware 122 programs polarity setting register 112 such that polarity setting 116 initializes one of the logic modules 134 at polarity controller 126 for alternating the starting polarity every $N^{th}$ frame. When driver controller 110 controls driver 104 to generate a set of short frames, it controls driver 104 to generate the short frames exhibiting the first starting polarity in response to the state of the reference signal 114. Signal generator 102 may automatically change the starting polarity for a subsequent frame to a second starting polarity by changing the state of the reference signal 114. When driver controller 110 controls driver 104 to generate a second set of short fames, it does so with the short frames exhibiting the second starting polarity responsive to the changed state of the reference signal 114. In the case of cable fault diagnosis, reflections, if any, are captured by an optional signal detector (not depicted) and sent to an ED pin of the digital interface coupled to a PHY controller via valid signal indications.

By way of a non-limiting example of another contemplated operation, a PHY may transmit Manchester-encoded frames having random starting polarities to attempt to reduce electromagnetic emissions (EME) generated by the transmission or the influence of other EME on the transmission. In this example, the configuration command 128 includes instructions for config firmware 122 to program polarity setting register 112 to generate polarity setting 116 that initializes one of the logic modules 134 at polarity controller 126 to randomize the starting polarity of each frame. When the PHY transceiver transitions from the configuration state back to the normal state or transmitting state (XMITTING) and begins transmitting, the starting polarity for each frame is random (including true random or approximated random, without limitation).

Figure 2:
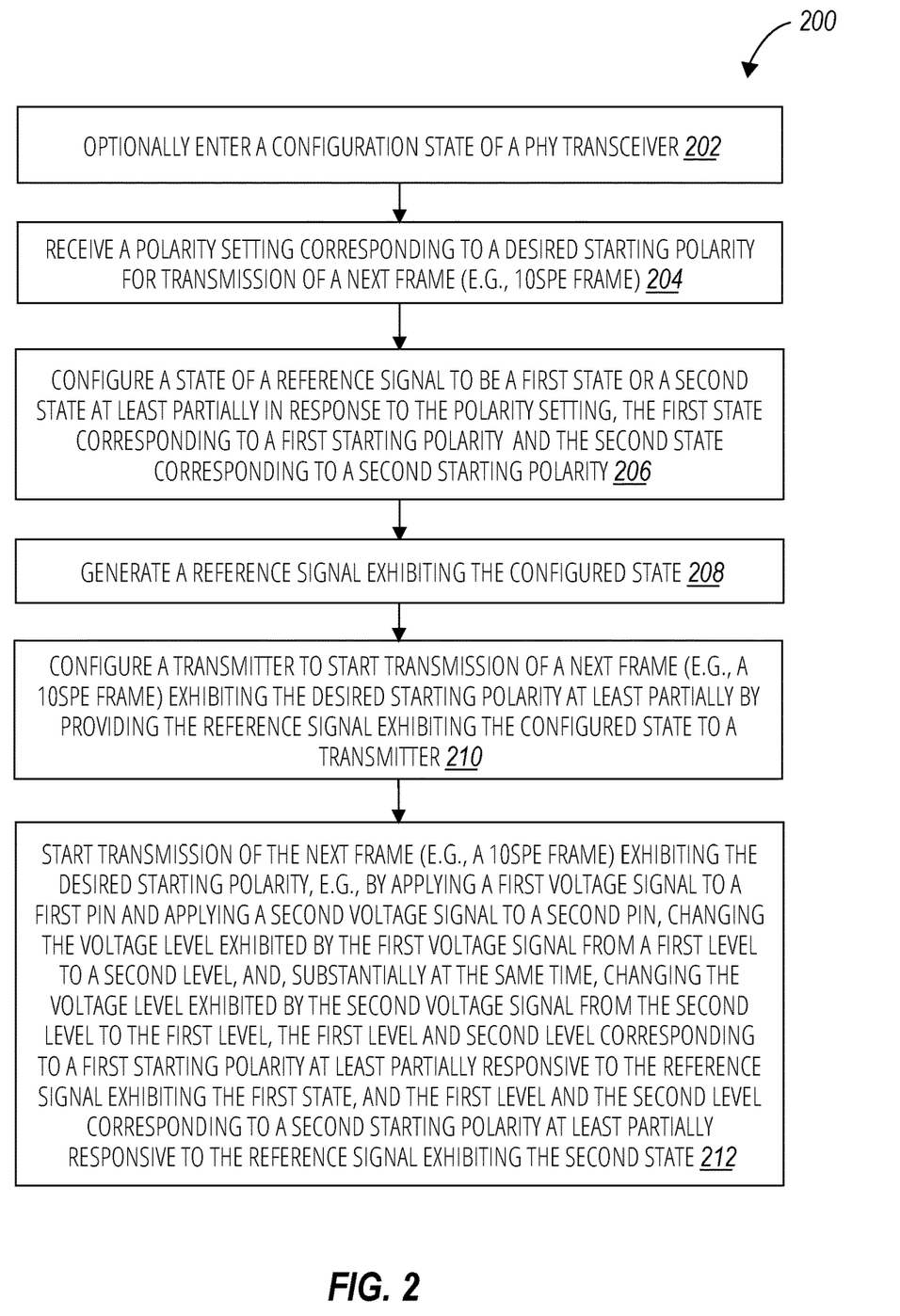
FIG. 2 is a flow diagram depicting a process for performing a portion of a cable diagnosis at a PHY transceiver, in accordance with one or more examples.

FIG. 2 is a flowchart depicting a process 200 for controlling the starting polarity at which a PHY transceiver starts transmission of a frame, in accordance with one or more examples.

At operation 202, process 200 optionally enters a configuration state of a 10SPE PHY transceiver and, in operation 204, process 200 receives a first configuration command indicating a polarity setting corresponding to a predetermined starting polarity for starting transmission of a next frame (e.g., a 10SPE frame, without limitation). In the configuration state, processor 132 (executing config firmware 122) of a 10SPE PHY transceiver may receive a configuration command 228 that includes the polarity setting and program the polarity setting register 212 accordingly.

At operation 206, process 200 configures a state of a reference signal at least partially in response to the predetermined starting polarity to be a first state or a second state. The first state corresponds to a first starting polarity when starting transmission of a frame and the second state corresponds to a second starting polarity when starting transmission of a frame.

At operation 208, process 200 generates a reference signal exhibiting the configured state. The reference signal may be a reference signal 114 for a driver controller 210 is to control driver 204 to generate a differential signal for a DME encoded frame.

At operation 210, process 200 configures a transmitter to start a next transmission of a frame (e.g., a 10SPE frame) exhibiting the predetermined starting polarity at least partially by providing a transmitter (e.g., transmitter 120) the reference signal exhibiting the configured state.

At operation 212, process 200 starts transmission of a next frame (e.g., a 10SPE frame, without limitation) exhibiting the predetermined starting polarity. Starting transmission of the next frame exhibiting the predetermined starting polarity may include applying a first voltage signal to a first pin and applying a second voltage signal to a second pin, changing the voltage level exhibited by the first voltage signal from a first level to a second level, and, substantially at the same time, changing the voltage level exhibited by the second voltage signal from the second level to the first level. The first level and second level may correspond to a first starting polarity at least partially responsive to the reference signal exhibiting the first state, or the first level and the second level may correspond to a second starting polarity at least partially responsive to the reference signal exhibiting the second state.

Figure 3:
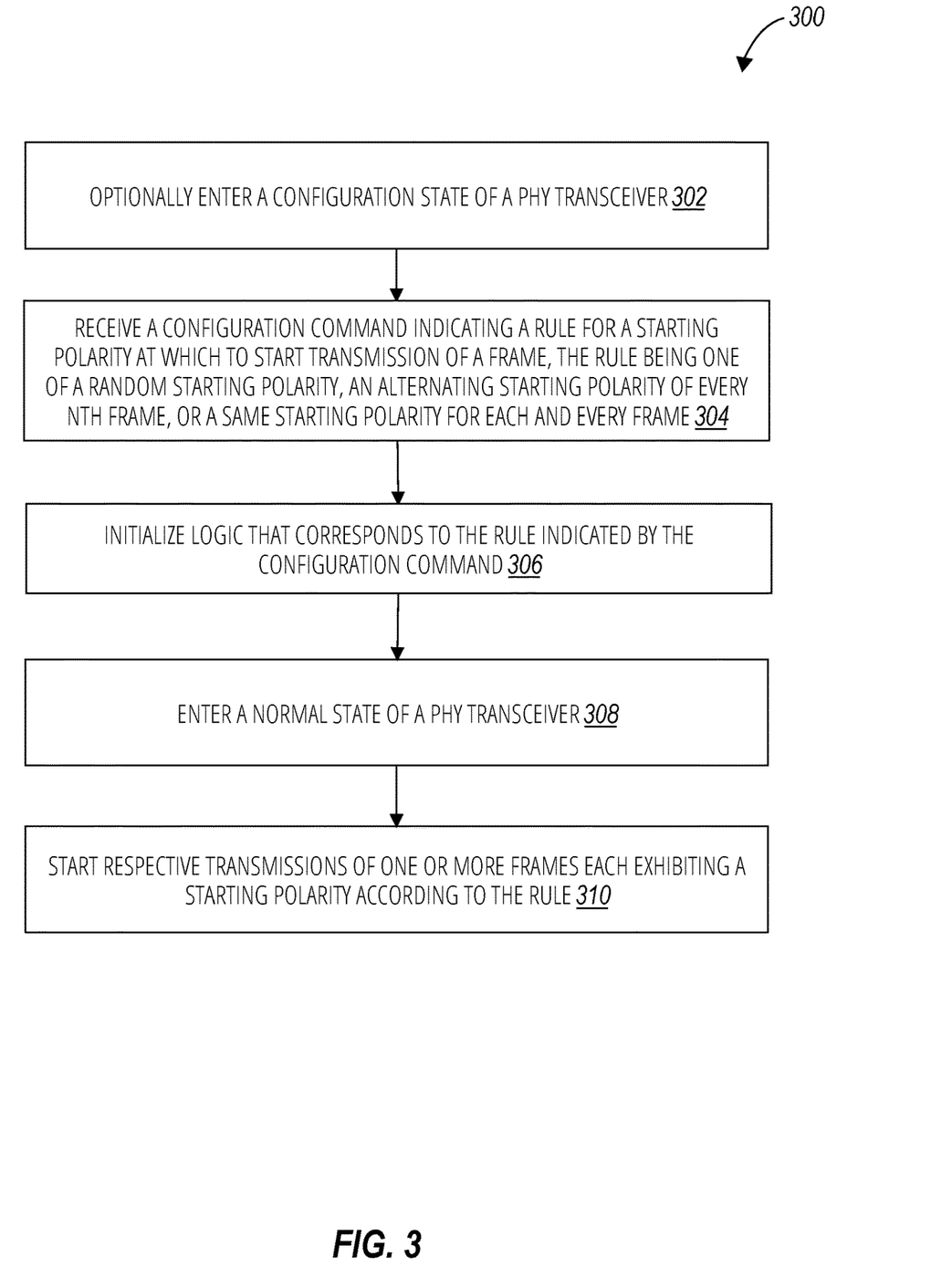
FIG. 3 illustrates a flow diagram depicting a process for controlling the starting polarity at which a PHY transceiver starts transmission of a frame.

FIG. 3 is a flow diagram depicting a process 300 for controlling the starting polarity at which a PHY transceiver starts transmission of a frame, in accordance with one or more examples. As discussed above, in some examples, logic modules 134 at polarity controller 126 may be initialized by processor 132 executing config firmware 122 in response to a configuration command 128 that indicates a rule for starting polarity at which to start transmission of one or more frames. Non-limiting examples of rules include a random starting polarity, an alternating starting polarity of every $n^{th}$ frame, and a same starting polarity for each and every frame.

At operation 302, process 300 enters a configuration mode of a 10SPE PHY transceiver (e.g., as in the state diagram depicted by FIG. 2). In a configuration mode, the polarity setting register 212 may be read (e.g., via RX/ED pins) and/or programmed (e.g., via TX pin) by a PHY controller via processor 132 executing config firmware 122 in response to configuration command 128.

At operation 304, process 300 receives a configuration command indicating a rule for a starting polarity at which a transmitter is to start transmission of frame. Non-limiting examples of a rule include: every frame starts with a first starting polarity (e.g., positive or negative), alternate, that is, change the staring starting polarity every Nth frame, randomly choose a first or a second starting polarity for a sequence of frames.

At operation 306, process 300 initializes one of the logic modules 134 of signal generator 102 that corresponds to the rule indicated by the configuration command. Logic modules 134 may comprise combinational logic or other primitive logic circuits for performing signal generation of reference signal 114 according to one or more rules, including the rule indicated by the configuration command. As non-limiting examples, logic modules 134 may be to set a state of reference signal 114 such that, while polarity setting 116 exhibits an associated state: each and every frame exhibits a same starting polarity, a starting polarity changes every $n^{th}$ frame, or the starting polarity of each frame is randomized. Processor 132 may initialize one of the logic modules 134 by setting a value at polarity setting register 112.

At operation 308, process 300 enters a normal state of a 10SPE PHY transceiver in which it performs transmission of frames.

At operation 310, process 300 starts respective transmissions of one or more frames each exhibiting a starting polarity according to the rule.

Split-PHY Architecture Example

A person having ordinary skill in the art would understand that controlling a starting polarity of a 10SPE frame at a physical layer transceiver may be desirable in other PHY architectures (e.g., other than split arrangement), and desirable for frames in other transmission schemes (e.g., other than 10SPE) and bit level encoding process (e.g., other than DME) where the data is not sensitive to polarity. Examples of starting polarity control may find particular application in a PHY transceiver of a PHY having a split arrangement. Use of the disclosed polarity controller in other architectures than a PHY having a split arrangement is specifically contemplated by, and does not exceed, the scope of this disclosure.

A PHY may be designed and/or manufactured in a high voltage temperature process, however, such processes may not be suitable (e.g., could damage or testing may be too expensive, without limitation) for, as non-limiting examples: PHY designs that have large and/or fast digital blocks, random access memory (RAM), and/or one time programmable (OTP) memory, without limitation. A non-limiting example of a high voltage temperature processes is bulk current injection (BCI) susceptibility testing. During BCI and other high voltage temperature processes known to the inventors of this disclosure, junction temperatures of about 175 degrees Celsius may be realized.

One option for addressing some of these concerns is to simplify a digital design for high voltage temperature processes to meet timing requirements or to fit on a die, but a design may not be amenable to simplification or meeting such timing or die space requirements. Size of a die or package may be increased, however, size of die and size of package are typically directly proportional to overall processing cost—the larger the die or package the higher the processing cost.

The 10BASE-T1S Transceiver Interface standard currently under specification development by Technology Committee 14 of the OPEN Alliance (hereinafter the "TC14 Standard") defines a 3-pin hardware interface for a split (controller-transceiver) 10SPE PHY (split-PHY).

Figure 4:
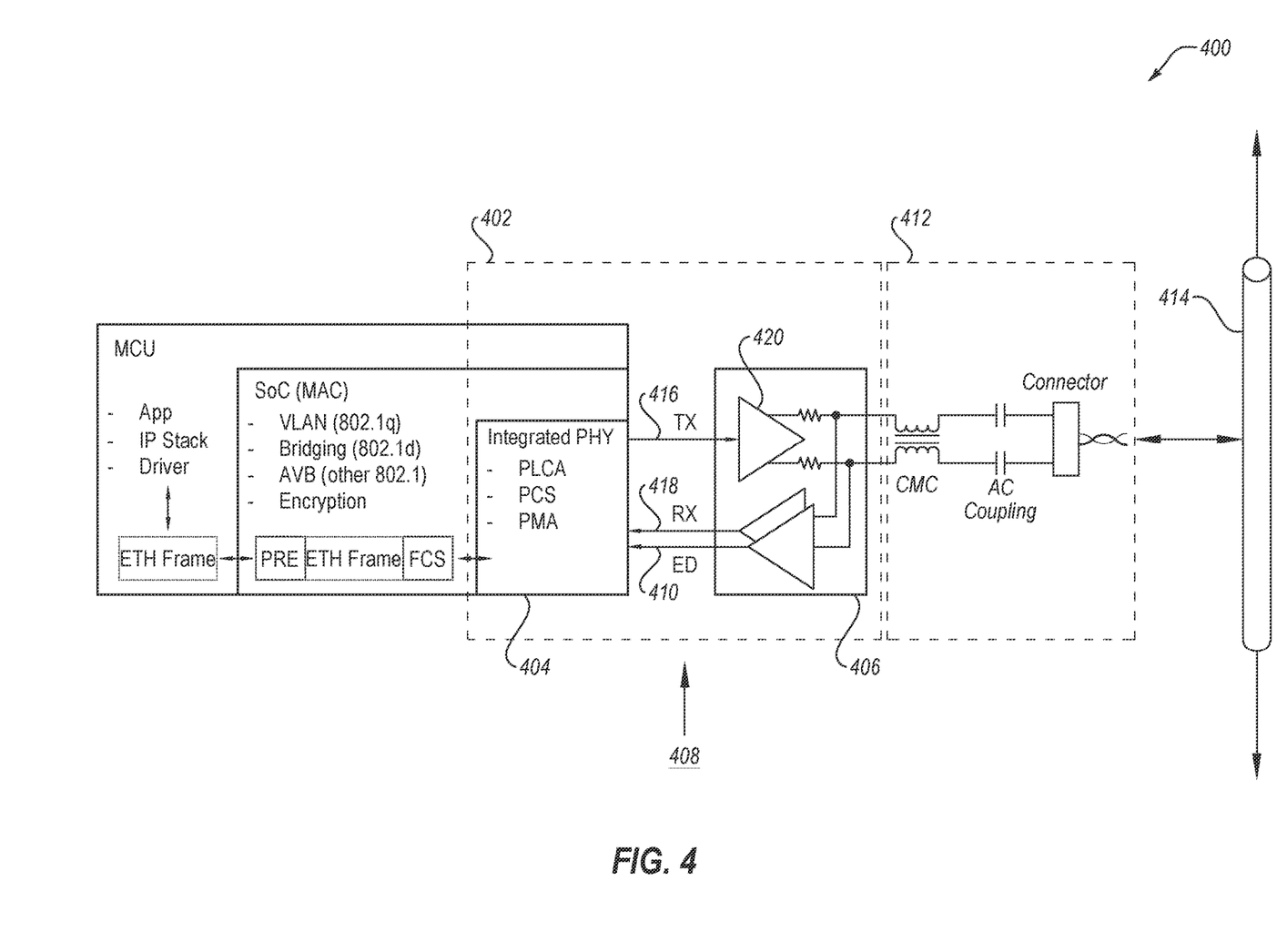
FIG. 4 illustrates an aspect of the subject matter in accordance with one example.

FIG. 4 is a block diagram depicting a system 400 that includes a split-PHY 402 coupled to a transmission medium 414 by a bus network interface 412, in accordance with one or more examples. The split-PHY 402 includes the defined 3-pin hardware interface (hardware interface 408) specified by the TC14 Standard as it presently stands. Generally speaking, a first portion of the split-PHY (PHY controller 404) includes digital blocks susceptible to damage during high voltage temperature processes and that may be located on a first die that does not undergo high voltage temperature processes. A second portion of the split-PHY (PHY transceiver 406) including analog and digital blocks less susceptible (individually or as a whole) to high voltage temperature processes may be located on a second die that can undergo high voltage temperature processes. PHY transceiver 406 includes a signal conditioner 420 to transmit frames exhibiting a predetermined starting polarity, such a signal conditioner 130, without limitation.

Hardware interface 408 includes three connections for signaling between PHY transceiver 406 and PHY controller 404: TX connection 416, RX connection 418, and ED connection 410. The 3 connections are typically implemented through respective pins attached to the respective integrated circuits of the split-PHY, and thus each of the 3 connections is associated with respective pins of PHY transceiver 406 and PHY controller 404. The TC14 Standard, as it presently stands, specifies uses for these connections some of which are associated with specific states of the PHY transceiver. In a normal state, TX connection 416 is used for conveying transmit frames from PHY controller 404 to PHY transceiver 406, RX connection 418 is used for conveying received frames from PHY transceiver 406 to PHY controller 404, and ED connection 410 is used for identifying valid signals from PHY transceiver 406 to PHY controller 404. The TC14 standard, as it presently stands, specifies that RX connection 418 is a comparator output of a transceiver that indicates a signal is above or below a threshold, ED connection 410 is a signal detector output of a transceiver that indicates inside or outside a threshold (i.e., indicates in-band and out-band signals), and TX is a clockless, stateful input of the transceiver.

A split-PHY may enable more efficient power consumption. Some portions of a split-PHY may enter a low-power or "sleep" mode to conserve power consumption by the split-PHY while other portions of the split-PHY (e.g., a transceiver or other hardware attachment elements, without limitation) supplied by an uninterrupted power supply may perform at least some functions of the split-PHY while the split-PHY as a whole is in a low-power mode.

In some cases, it may be desirable to locate specific functions or operations at the portion of a split-PHY that is in the uninterrupted power domain so that they can operate to some extent while in a low power mode. As non-limiting examples, these may be the functions that are associated with low power or wake detection for the split-PHY, a node, a network segment, or a network, or functions associated with fault detection on a physical transmission medium ("cable fault detection").

As mentioned above, in a typical split-PHY, first and second portions of the split-PHY are coupled by a hardware interface of 3 wired connections. Such first and second portions of the split-PHY may each include interface logic configured to associate individual pins with specific signals of the hardware interface, and handle communication and signal propagation over the connections of the hardware interface. Any suitable number of pins and connections could be used to implement a hardware interface of a split-PHY. Moreover, designers may take into account communication over such a hardware interface when choosing where to locate digital blocks for implementing features and functions of a split-PHY architecture.

Notwithstanding the foregoing or other implementation challenges, a split-PHY architecture may enable a split-PHY (and systems and devices incorporating the same such as network switches, bridges, and end points, without limitation) to be more digitally intensive and more power efficient than some unitary PHY architectures, and so enable designers to take into account these aspects.

Figure 5:
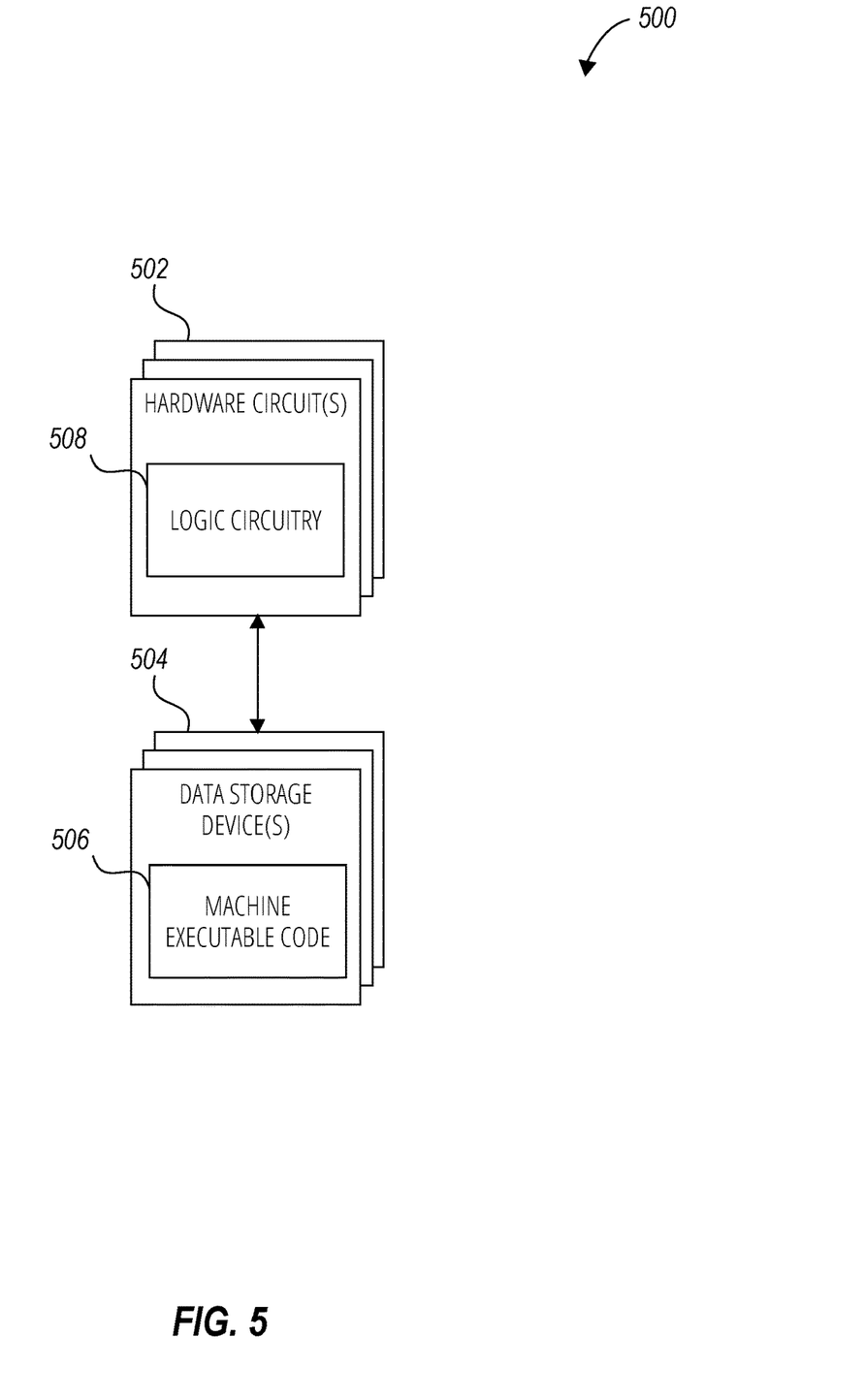
FIG. 5 is a block diagram depicting a circuitry for performing some or a totality of the features or elements of disclosed for one or more examples.

It will be appreciated by those of ordinary skill in the art that functional elements of examples disclosed herein (e.g., functions, operations, acts, processes, and/or methods) may be implemented in any suitable hardware, software, firmware, or combinations thereof. FIG. 5 depicts non-limiting examples of implementations of functional elements disclosed herein. In some examples, some or all portions of the functional elements disclosed herein may be performed by hardware specially configured for carrying out the functional elements.

FIG. 5 is a block diagram of circuitry 500 that, in some examples, may be used to implement various functions, operations, acts, processes, and/or methods disclosed herein. The circuitry 500 includes one or more processors (sometimes referred to herein as "processors 502") operably coupled to one or more data storage devices (sometimes referred to herein as "storage 504"). The storage 504 includes machine executable code 506 stored thereon and the processors 502 include logic circuitry 508. The machine executable code 506 includes information describing functional elements that may be implemented by (e.g., performed by) the logic circuitry 508. The logic circuitry 508 is adapted to implement (e.g., perform) the functional elements described by the machine executable code 506. The circuitry 500, when executing the functional elements described by the machine executable code 506, should be considered as special purpose hardware configured for carrying out functional elements disclosed herein. In some examples the processors 502 may be configured to perform the functional elements described by the machine executable code 506 sequentially, concurrently (e.g., on one or more different hardware platforms), or in one or more parallel process streams.

When implemented by logic circuitry 508 of the processors 502, the machine executable code 506 is configured to adapt the processors 502 to perform operations of examples disclosed herein. For example, the machine executable code 506 may be configured to adapt the processors 502 to perform at least a portion or a totality of the blocks and processes depicted by FIGS. 1 to 4. As another example, the machine executable code 506 may be configured to adapt the processors 502 to perform at least a portion or a totality of the operations discussed for one or more of a PHY transceiver or split-PHY transceiver discussed herein. As another example, the machine executable code 506 may be configured to adapt the processors 502 to perform at least a portion or a totality of the operations discussed for one or more of polarity controller 126, polarity setting register 112, signal generator 102, logic modules 134, transmitter 120, driver controller 110, driver 104, and processor 132.

As a specific, non-limiting example, the machine executable code 506 may be configured to adapt the processors 502 to perform some or a totality of the signal conditioning or polarity control discussed herein.

The processors 502 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute functional elements corresponding to the machine executable code 506 (e.g., software code, firmware code, hardware descriptions) related to examples of the present disclosure. It is noted that a general-purpose processor (may also be referred to herein as a host processor or simply a host) may be a microprocessor, but in the alternative, the processors 502 may include any conventional processor, controller, microcontroller, or state machine. The processors 502 may also be implemented as a combination of computing devices, such as a combination of a DSP and a microprocessor, a plurality of microprocessors, one or more microprocessors in conjunction with a DSP core, or any other such configuration.

In some examples the storage 504 includes volatile data storage (e.g., random-access memory (RAM)), non-volatile data storage (e.g., Flash memory, a hard disc drive, a solid state drive, erasable programmable read-only memory (EPROM), etc.). In some examples the processors 502 and the storage 504 may be implemented into a single device (e.g., a semiconductor device product, a system-on-chip (SOC), or a system-basis-chip, without limitation). In some examples the processors 502 and the storage 504 may be implemented into separate devices.

In some examples the machine executable code 506 may include computer-readable instructions (e.g., software code, firmware code). By way of non-limiting example, the computer-readable instructions may be stored by the storage 504, accessed directly by the processors 502, and executed by the processors 502 using at least the logic circuitry 508. Also by way of non-limiting example, the computer-readable instructions may be stored on the storage 504, transferred to a memory device (not shown) for execution, and executed by the processors 502 using at least the logic circuitry 508. Accordingly, in some examples the logic circuitry 508 includes electrically configurable logic circuitry 508.

In some examples the machine executable code 506 may describe hardware (e.g., circuitry) to be implemented in the logic circuitry 508 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, VERILOG™, SYSTEM-VERILOG™ or very large scale integration (VLSI) hardware description language (VHDL™) may be used.

HDL descriptions may be converted into descriptions at any of numerous other levels of abstraction as predetermined. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 508 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some examples the machine executable code 506 may include an HDL, an RTL, a GL description, a mask level description, other hardware description, or any combination thereof.

In examples where the machine executable code 506 includes a hardware description (at any level of abstraction), a system (not shown, but including the storage 504) may be configured to implement the hardware description described by the machine executable code 506. By way of non-limiting example, the processors 502 may include a programmable logic device (e.g., an FPGA or a PLC) and the logic circuitry 508 may be electrically controlled to implement circuitry corresponding to the hardware description into the logic circuitry 508. Also by way of non-limiting example, the logic circuitry 508 may include hard-wired logic manufactured by a manufacturing system (not shown, but including the storage 504) according to the hardware description of the machine executable code 506.

Regardless of whether the machine executable code 506 includes computer-readable instructions or a hardware description, the logic circuitry 508 is adapted to perform the functional elements described by the machine executable code 506 when implementing the functional elements of the machine executable code 506. It is noted that although a hardware description may not directly describe functional elements, a hardware description indirectly describes functional elements that the hardware elements described by the hardware description are capable of performing.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc.," or "one or more of A, B, and C, etc.," is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B." As used herein, "each" means some or a totality. As used herein, "each and every" means a totality.

Any characterization in this description of something as "typical," "conventional," "known," or the like does not necessarily mean that it is disclosed in the prior art or that the discussed aspects are appreciated in the prior art. Nor does it necessarily mean that, in the relevant field, it is widely known, well-understood, or routinely used. Such characterizations should be understood to mean "known to the inventor(s) of this disclosure."

Additional non-limiting examples of the disclosure include:

Example 1: A signal conditioner of a 10SPE physical layer transceiver, comprising: a transmitter to transmit 10SPE frames; and a polarity controller to control the transmitter to start a transmission of a next frame exhibiting a predetermined starting polarity.

Example 2: The signal conditioner according to Example 1, wherein the transmitter is configured to generate a Differential Manchester Encoded signal corresponding to the next frame, wherein an initial state transition exhibited by the Differential Manchester Encoded signal is at least partially responsive to a configured state of a reference signal.

Example 3: The signal conditioner according to any of Examples 1 and 2, wherein the polarity controller comprises: a polarity setting register; and a signal generator configured to generate the reference signal exhibiting the configured state responsive to a value of the polarity setting register.

Example 4: The signal conditioner according to any of Examples 1 through 3, wherein the polarity setting register is programmable by a 10SPE physical layer controller.

Example 5: The signal conditioner according to any of Examples 1 through 4, wherein the transmitter is configured to: apply a first voltage signal to a first pin; apply a second voltage signal to a second pin; change a voltage level exhibited by the first voltage signal from a first level to a second level; and change a voltage level exhibited by the second voltage signal from the second level to the first level.

Example 6: The signal conditioner according to any of Examples 1 through 4, wherein: respective values of the first level and the second level correspond to a first starting polarity at least partially responsive to the reference signal exhibiting a first state, and the respective values of the first level and the second level correspond to a second starting polarity at least partially responsive to the reference signal exhibiting a second state.

Example 7: A method of transmitting a 10SPE frame, the method comprising: receiving a polarity setting corresponding to a predetermined starting polarity for starting transmission of a 10SPE frame; configuring a transmitter to start a transmission of a next 10SPE frame with the predetermined starting polarity; and starting the transmission of the next 10SPE frame exhibiting the predetermined starting polarity.

Example 8: The method according to Example 7, wherein the configuring the transmitter to start the transmission of the next 10SPE frame with the predetermined starting polarity comprises: configuring the transmitter to start the transmission of the next 10SPE frame with the predetermined starting polarity responsive to a state of a reference signal.

Example 9: The method according to any of Examples 7 and 8, comprising configuring the state of the reference signal to be a first state or a second state.

Example 10: The method according to any of Examples 7 through 9, comprising generating the reference signal exhibiting a configured state.

Example 11: The method according to any of Examples 7 through 10 comprising providing the reference signal exhibiting the configured state to the transmitter.

Example 12: The method according to any of Examples 7 through 11, wherein the starting the transmission of the next 10SPE frame exhibiting the predetermined starting polarity comprises: applying a first voltage signal to a first pin; applying a second voltage signal to a second pin; changing a voltage level exhibited by the first voltage signal from a first level to a second level; and changing a voltage level exhibited by the second voltage signal from the second level to the first level.

Example 13: The method according to any of Examples 7 through 12, wherein the first level and the second level correspond to a first starting polarity at least partially responsive to the reference signal exhibiting the first state, or the first level and the second level correspond to a second starting polarity at least partially responsive to the reference signal exhibiting the second state.

Example 14: A system, comprising: a signal conditioner configured to generate Ethernet frames; and a processor and a configuration firmware, wherein the configuration firmware, when executed by the processor, is configured to enable the processor to initialize a logic module of the signal conditioner that corresponds to a rule for a starting polarity at which to start transmission of the Ethernet frames.

Example 15: The system according to Example 14, wherein the rule for the starting polarity at which to start transmission of the Ethernet frames is a random starting polarity.

Example 16: The system according to any of Examples 14 and 15, wherein the rule for the starting polarity at which to start transmission of the Ethernet frames is an alternating starting polarity every Nth frame.

Example 17: The system according to any of Examples 14 through 16, wherein the rule for the starting polarity at which to start transmission of the Ethernet frames is a same starting polarity for every frame.

Example 18: The system according to any of Examples 14 through 17, wherein the configuration firmware, when executed by the processor, is configured to enable the processor to receive a command indicating the rule and initialize the logic module of the signal conditioner at least partially responsive to the command.

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventors.

We claim:

1. A signal conditioner of a 10 Mega bit per second (Mpbs) Single Pair Ethernet (10SPE) physical layer transceiver, comprising:
   a transmitter for transmission of 10SPE frames encoded according to an encoding scheme that is polarity insensitive; and
   a polarity controller to control the transmitter to start a transmission of a next frame exhibiting a predetermined starting polarity.

2. The signal conditioner of claim 1, wherein the transmitter is to generate a Differential Manchester Encoded signal corresponding to the next frame, wherein an initial state transition exhibited by the Differential Manchester Encoded signal is at least partially responsive to a configured state of a reference signal.

3. A signal conditioner of a 10 Mega bit per second (Mpbs) Single Pair Ethernet (10SPE) physical layer transceiver, comprising:
   a transmitter for transmission of 10SPE frames, wherein the transmitter to generate a Differential Manchester Encoded signal corresponding to a next frame, wherein an initial state transition exhibited by the Differential Manchester Encoded signal is at least partially responsive to a configured state of a reference signal; and
   a polarity controller to control the transmitter to start a transmission of a next frame exhibiting a predetermined starting polarity, wherein the polarity controller comprises:
   a polarity setting register; and
   a signal generator to generate the reference signal exhibiting the configured state responsive to a value of the polarity setting register.

4. The signal conditioner of claim 3, wherein the polarity setting register is programmable by a 10SPE physical layer controller.

5. A signal conditioner of a 10 Mega bit per second (Mpbs) Single Pair Ethernet (10SPE) physical layer transceiver, comprising:
   a transmitter for transmission of 10SPE frames, wherein the transmitter is to generate a Differential Manchester Encoded signal corresponding to a next frame, wherein an initial state transition exhibited by the Differential Manchester Encoded signal is at least partially responsive to a configured state of a reference signal;
   a polarity controller to control the transmitter to start a transmission of the next frame exhibiting a predetermined starting polarity, wherein, responsive to the polarity controller, the transmitter to:
apply a first voltage signal to a first pin;
apply a second voltage signal to a second pin;
change a voltage level exhibited by the first voltage signal from a first level to a second level; and
change a voltage level exhibited by the second voltage signal from the second level to the first level,
wherein the first voltage level and the second voltage level are at least partially based on the predetermined starting polarity.

6. The signal conditioner of claim 5, wherein:
respective values of the first level and the second level correspond to a first starting polarity at least partially responsive to the reference signal exhibiting a first state, and
the respective values of the first level and the second level correspond to a second starting polarity at least partially responsive to the reference signal exhibiting a second state.

7. A method of transmitting a 10 Mega bit per second (Mpbs) Single Pair Ethernet (10SPE) frame, the method comprising:
receiving a polarity setting corresponding to a predetermined starting polarity for starting transmission of a 10SPE frame;
configuring a transmitter to start a transmission of a next 10SPE frame with the predetermined starting polarity; and
starting the transmission of the next 10SPE frame exhibiting the predetermined starting polarity,
wherein the next 10SPE frame is encoded according to a polarity insensitive encoding scheme.

8. The method of claim 7, wherein the configuring the transmitter to start the transmission of the next 10SPE frame with the predetermined starting polarity comprises:
configuring the transmitter to start the transmission of the next 10SPE frame with the predetermined starting polarity responsive to a state of a reference signal.

9. A method of transmitting a 10 Mega bit per second (Mpbs) Single Pair Ethernet (10SPE) frame, the method comprising:
receiving a polarity setting corresponding to a predetermined starting polarity for starting transmission of a 10SPE frame;
configuring a state of a reference signal to be a first state or a second state;
configuring a transmitter to start a transmission of a next 10SPE frame with the predetermined starting polarity responsive to the configured state of a reference signal; and
starting the transmission of the next 10SPE frame exhibiting the predetermined starting polarity.

10. A method of transmitting a 10 Mega bit per second (Mpbs) Single Pair Ethernet (10SPE) frame, comprising:
receiving a polarity setting corresponding to a predetermined starting polarity for starting transmission of a 10SPE frame;
generating a reference signal exhibiting a configured state;
configuring a transmitter to start a transmission of a next 10SPE frame with the predetermined starting polarity responsive to the configured state of the reference signal; and
starting the transmission of the next 10SPE frame exhibiting the predetermined starting polarity.

11. The method of claim 10 comprising providing the reference signal exhibiting the configured state to the transmitter.

12. The method of claim 11, wherein the starting the transmission of the next 10SPE frame exhibiting the predetermined starting polarity comprises:
applying a first voltage signal to a first pin;
applying a second voltage signal to a second pin;
changing a voltage level exhibited by the first voltage signal from a first level to a second level; and
changing a voltage level exhibited by the second voltage signal from the second level to the first level.

13. The method of claim 12, wherein the first level and the second level correspond to a first starting polarity at least partially responsive to the reference signal exhibiting a first state, or the first level and the second level correspond to a second starting polarity at least partially responsive to the reference signal exhibiting a second state.

* * * * *